US011042955B2

(12) United States Patent
Lim et al.

(10) Patent No.: US 11,042,955 B2
(45) Date of Patent: Jun. 22, 2021

(54) MANIPULATING DISPLAY CONTENT OF A GRAPHICAL USER INTERFACE

(71) Applicant: NextLabs, Inc., San Mateo, CA (US)

(72) Inventors: Keng Lim, Atherton, CA (US); Poon Fung, Cupertino, CA (US)

(73) Assignee: NextLabs, Inc., San Mateo, CA (US)

( * ) Notice: Subject to any disclaimer, the term of this patent is extended or adjusted under 35 U.S.C. 154(b) by 0 days.

(21) Appl. No.: 15/482,655

(22) Filed: Apr. 7, 2017

(65) Prior Publication Data

US 2017/0352172 A1    Dec. 7, 2017

Related U.S. Application Data

(60) Provisional application No. 62/365,886, filed on Jul. 22, 2016, provisional application No. 62/344,557, filed on Jun. 2, 2016.

(51) Int. Cl.
| | |
|---|---|
| *G06T 1/00* | (2006.01) |
| *G06F 3/14* | (2006.01) |
| *G09G 5/14* | (2006.01) |
| *G09G 5/397* | (2006.01) |
| *G09G 5/399* | (2006.01) |
| *G06T 11/00* | (2006.01) |
| *G06F 21/84* | (2013.01) |

(52) U.S. Cl.
CPC .............. *G06T 1/0021* (2013.01); *G06F 3/14* (2013.01); *G06F 21/84* (2013.01); *G06T 11/00* (2013.01); *G09G 5/14* (2013.01); *G09G 5/397* (2013.01); *G09G 5/399* (2013.01); *G06F 2221/0733* (2013.01); *G06T 2210/62* (2013.01); *G09G 2358/00* (2013.01)

(58) Field of Classification Search
CPC .. G06F 3/0481; G06F 3/0482; G06F 3/04886; G06F 2203/04803; G06F 3/14; G06F 21/84; G06F 2221/0733; G06T 11/60; G06T 1/0021; G06T 1/0028; G06T 1/0035; G06T 1/0042; G06T 1/0071; G06T 11/00; G06T 2210/62; G09G 5/377; G09G 5/14; G09G 5/397; G09G 5/399; G09G 2358/00
USPC ................... 345/629, 634, 636, 641; 382/100
See application file for complete search history.

(56) References Cited

U.S. PATENT DOCUMENTS

| | | | | |
|---|---|---|---|---|
| 6,310,962 | B1* | 10/2001 | Chung ................. | G06T 1/0085 382/100 |
| 7,593,543 | B1* | 9/2009 | Herz ...................... | G06F 21/10 375/134 |
| 8,526,666 | B1* | 9/2013 | Hadden ................. | G06F 21/10 345/592 |
| 2001/0054150 | A1* | 12/2001 | Levy ...................... | G06F 21/10 713/176 |
| 2002/0135585 | A1* | 9/2002 | Dye ........................ | G06T 1/60 345/531 |
| 2004/0075670 | A1* | 4/2004 | Bezine ............... | H04N 5/44504 345/619 |

(Continued)

*Primary Examiner* — Diane M Wills
(74) *Attorney, Agent, or Firm* — Aka Chan LLP

(57) ABSTRACT

A method and system of augmenting display content in a graphical user interface environment. Content produced by a graphical user interface is augmented with additional content before the content is displayed. In an example, a security marker may be rendered on top of an existing display content using the method described to protect high-value or sensitive information.

34 Claims, 13 Drawing Sheets

(56) References Cited

U.S. PATENT DOCUMENTS

| | | | | |
|---|---|---|---|---|
| 2005/0088447 | A1* | 4/2005 | Hanggie | G06F 3/0481 |
| | | | | 345/545 |
| 2011/0283243 | A1* | 11/2011 | Eckhardt | G06F 3/04886 |
| | | | | 715/865 |
| 2012/0255029 | A1* | 10/2012 | Kim | G06F 21/10 |
| | | | | 726/26 |
| 2012/0326993 | A1* | 12/2012 | Weisman | G09G 5/377 |
| | | | | 345/173 |
| 2013/0194301 | A1* | 8/2013 | Robbins | G06F 21/60 |
| | | | | 345/629 |
| 2014/0201844 | A1* | 7/2014 | Buck | G06F 21/50 |
| | | | | 726/26 |
| 2014/0247961 | A1* | 9/2014 | Kim | H04N 21/4882 |
| | | | | 382/100 |
| 2014/0376767 | A1* | 12/2014 | Powers | G06T 1/0021 |
| | | | | 382/100 |
| 2015/0242981 | A1* | 8/2015 | Reed | G06T 1/00 |
| | | | | 382/100 |
| 2015/0278980 | A1* | 10/2015 | Sinclair | G06T 1/0064 |
| | | | | 382/100 |
| 2018/0144160 | A1* | 5/2018 | Shirakura | G06K 9/00979 |

* cited by examiner

MANIPULATING DISPLAY CONTENT OF A GRAPHICAL USER INTERFACE

CROSS-REFERENCE TO RELATED APPLICATIONS

This application claims the benefit of U.S. patent applications 62/365,886, filed Jul. 22, 2016, and 62/344,557, filed Jun. 2, 2016, which are incorporated by reference along with all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to graphical user interfaces, and more specifically, to manipulating content to be displayed on a computing device.

A computing devices such as a desktop or laptop computer typically provides a graphical user interface to present information to and interact with a user. A graphical user interface provides one or more display areas referred to as windows to an application program. One or more application programs may draw or output to one or more windows that may overlap each other visually. A window manager takes contents of the one or more windows and produces composite content for each display or monitor.

In some situations, augmenting display content produced by an application program or a window manager is desirable. In an example, a user opens a protected document on a computing device for viewing. At the moment the content of the protected document becomes visible, the content may be captured by a screen capture application or a camera external to the computing device, and the captured content becomes unprotected. To protect the content being displayed and minimize misuse of the content, it is desirable to augment the content by rendering a security marker on top of the content being displayed. The technique applied to augment display content may be used to enhance information security, implement augmented reality functions, annotate display content, supplement information in display content, enhancing user interface navigation, and more.

Therefore, improved techniques are needed. A technique of augmenting display content is described.

BRIEF SUMMARY OF THE INVENTION

A method and system of augmenting display content in a graphical user interface environment. Content produced by a graphical user interface is augmented with additional content before the content is displayed. In an example, a security marker may be rendered on top of an existing display content using the method described to protect high-value or sensitive information.

In an implementation, a method includes: providing a computing device having a graphical user interface and a graphics processing unit where the graphics processing unit having a video buffer; providing the graphical user interface having a compositing window manager where the compositing window manager produces composite content for a display; providing a display content augmentation adapter for producing augmentation content where the compositing window manager invokes the display content augmentation adapter after producing composite content but before making the video buffer available for video refresh; opening a document in an application program on the computing device; producing display content in a display buffer with content of the document by the application program; producing composite content in the video buffer with the display content in the display buffer by the compositing window manager where the composite content includes content of the document; and invoking the display content augmentation adapter to render augmentation content over the composite content by the compositing window manager where the augmentation content includes a security marker rendered over content of the document.

In various implementations, the document is a spreadsheet, a 3D CAD drawing, a video file, or a video stream, or any combination of these. The compositing window manager is Microsoft Windows Desktop Window Manager. The display content augmentation adapter is installed in a process during startup phrase of the process. The display content includes includes rasterized data, a graphical element, or a graphics rendering command, or any combination of these. The graphics rendering command is executed in the graphics processing unit.

The producing composite content in the video buffer with the display content in the display buffer by the compositing window manager further include: sending a subset of the display content in the display buffer to the graphics processing unit. The display content augmentation adapter renders augmentation content using Microsoft Direct3D application programming interface. The display content augmentation adapter renders augmentation content using OpenGL application programming interface.

The augmentation content includes a text string, or graphics or an image, or any combination. The augmentation content is semitransparent, where the composite content under the augmentation content is visible. The augmentation content includes a disclaimer message or a warning message, or any combination.

The security marker is opaque, where the composite content under the security marker is not visible. The security marker describes current user of the computing device. The security marker can include a date.

This application incorporates by reference U.S. patent applications 60/755,019, filed Dec. 29, 2005, 60/776,036, filed Dec. 29, 2005, 60/743,121, filed Jan. 11, 2006, 60/821,050, filed Aug. 1, 2006, 60/870,195, filed Dec. 15, 2006, 61/357,016, filed Jun. 21, 2010, 61/368,408, filed Jul. 28, 2010, 61/471,682, filed Apr. 4, 2011, 62/220,104, filed Sep. 17, 2015, Ser. No. 11/383,159, filed May 12, 2006, Ser. No. 11/383,159, filed May 12, 2006, Ser. No. 11/383,161, filed May 12, 2006, Ser. No. 11/383,164, filed May 12, 2006, Ser. No. 11/615,477, filed Dec. 22, 2006, Ser. No. 13/165,730, filed Jun. 21, 2011, Ser. No. 13/193,588, filed Jul. 28, 2011, Ser. No. 13/439,827, filed Apr. 4, 2012, 62/220,104, filed Sep. 17, 2015, 62/238,009, filed Oct. 6, 2015, 62/240,391, filed Oct. 11, 2015, and Ser. No. 15/268,155, filed Sep. 16, 2016.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
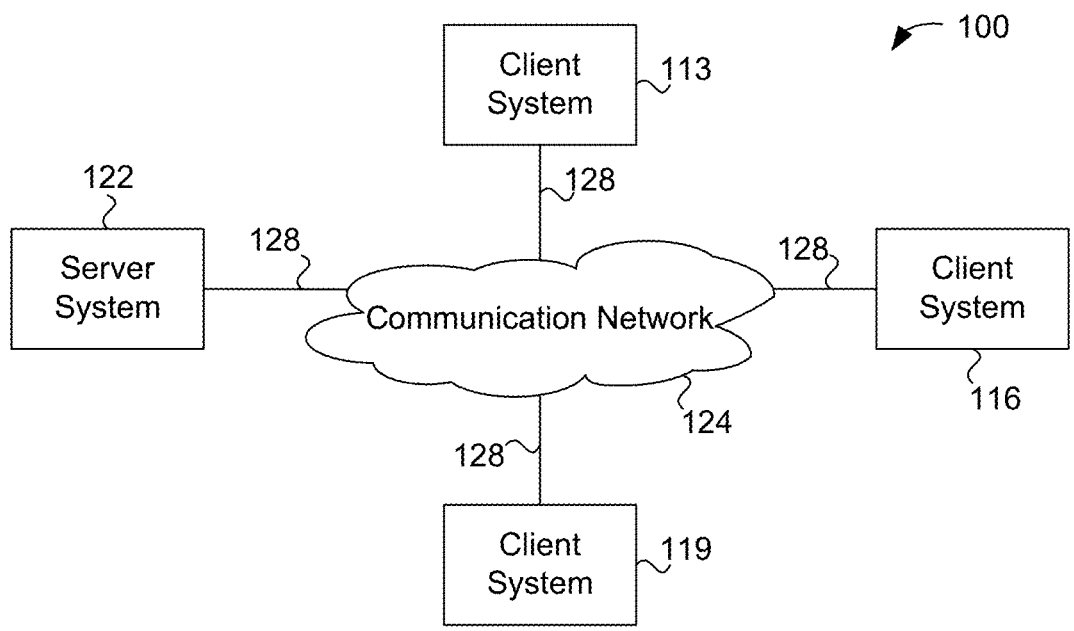
FIG. 1 shows a simplified block diagram of a distributed computer network and clients.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, the Chrome browser by Google Inc., the Safari browser by Apple Inc., and others.

Figure 2:
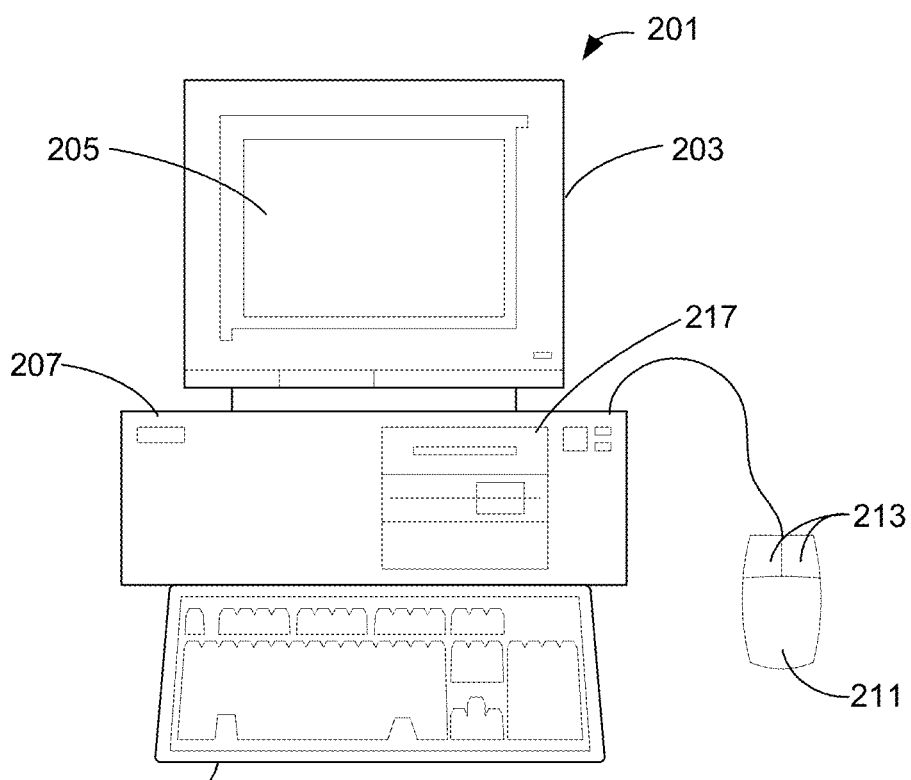
FIG. 2 shows a more detailed diagram of a computer system which may be a client or server.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media may also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
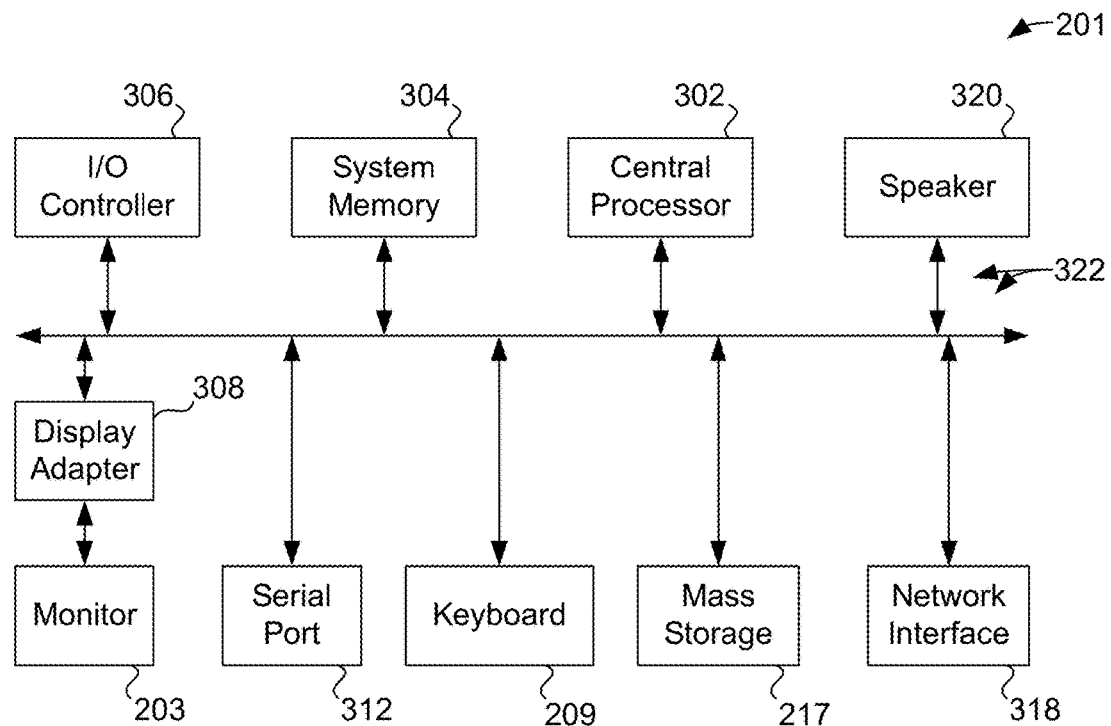
FIG. 3 shows a system block diagram of computer system.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, or Microsoft Xbox 360 central processing unit (CPU).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C #, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle). An operating system for the system may be one of the Microsoft Windows® family of operating systems (e.g., Windows 95, 98, Me, Windows NT, Windows 2000, Windows XP, Windows Vista, Windows 7, Windows CE, Windows Mobile), Linux, UNIX, Sun OS, Ubuntu, or Macintosh OS X. Other operating systems may be used. Microsoft Windows is a trademark of Microsoft Corporation.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Graphical User Interface

A graphical user interface provides means to present information to and accept input from a user on a computing device. It manages output to a display or monitor and directs input from keyboard, mouse, trackpad and other input devices to its intended recipient. A graphical user interface may be found on a desktop or laptop computer, tablet, smartphone, information kiosk, and more. Operating systems that provide graphical user interfaces include Microsoft Windows®, Apple OS/X® and iOS®, Google Android™, Linux® or Unix® package with Open Group X Window System™, and more.

A graphical user interface typically employs a window manager to manage window hierarchies, notifications and other display elements. A window manager also renders graphics such as window frame and background that are not rendered by an application program. A window manager may also produce composite content and handle communication with a graphics processing unit (GPU) (sometimes referred to as graphics accelerator). A GPU may exist as a standalone chip. A GPU may be integrated or packaged with a CPU or chipset. A window manager may support one or more displays. A window manager may allow one application program to take up an entire display or it may have multiple application programs to share one display. A display includes a liquid crystal display (LCD) monitor, cathode ray tube monitor, LCD projector, electronic billboard, and any surface that is capable of rendering visual information electronically. To support user interaction, a window manager also translates (e.g., generates double click event), directs (e.g., sends mouse or keyboard event to a window with focus) and handles (e.g., processes window move, resize or close event) user input.

A key task of a window manager is managing video buffers (sometimes referred to as frame buffers). A computing device may have one or more video buffers. A video buffer may reside in main or video memory. A video buffer may be integrated into a central processing unit (CPU) or graphics processing unit. A window manager may assign a region of a video buffer to an application program and allow the application program to write to the video buffer directly. Alternatively, a window manager may provide one or more display buffers to an application program and compose a video frame based on content of the one or more display buffers without having the application program writing to a video buffer directly.

A window manager that produces a video frame by having one or more application programs writing to a video buffer directly is referred to as stacking window manager. A window manager that provides each application program with its own display buffer, produces composite content based on content of one or more display buffers, and saves composite content in a video buffer is referred to as compositing window manager or composition engine. An application program may have one or more display buffers. Examples of operating systems implementing stacking window managers include Microsoft Windows XP® or prior versions, Apple OS/X® v9.0 or prior versions, or Linux® or Unix® running Open Group X Window System™ versions released prior to 2005. Examples of operating systems implementing compositing window managers include Microsoft Windows Vista®, Windows 7®, Windows 8® or Windows 10® with Desktop Window Manager, Apple OS/X® v10.0 or subsequent releases with Quartz Compositor, or Linux® or Unix® running Open Group X Window System™ versions released in 2005 or after with Xfwm or Compiz.

With a stacking window manager, application programs cooperate with a window manager to produce a video frame. A video frame is the content consumed by video hardware in one refresh cycle. When a stacking window manager determines that a region of a video buffer needs to be updated, it informs all affected application programs to update the region so the video buffer will have updated content in next refresh cycle. Nevertheless, if an application program takes too long to update a region and total update time exceeds the time allowed by a given frame rate (e.g., 1/30 second for 30 frames/second or 1/60 second for 60 frames/second), an incomplete video frame will be displayed.

Unlike a stacking window manager, a compositing window manager does not allow an application program to write to a video buffer. Each application program writes to one or more dedicated display buffers and a compositing window manager produces composite content using contents from one or more dedicated display buffers of one or more application programs. A compositing window manager writes composite content it produces to a video buffer. A compositing window manager synchronizes its composition step with video refresh cycles to avoid an incomplete video frame being displayed.

Figure 4:
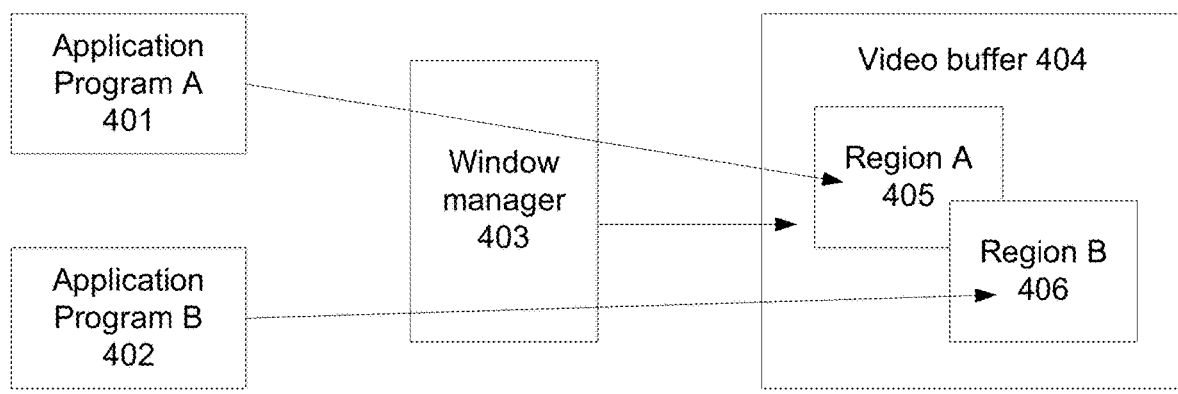
FIG. 4 shows a block diagram of a stacking window manager and two application programs sharing access to a video buffer.

FIG. 4 shows a stacking window manager manages access to a video buffer. Application Program A 401 and Application Program B 402 are two application programs running on a computing device. Both application programs produce display contents that may be shown on a display. To show the display contents on the same display, a window manager 403 on the computing device sets up two regions on a video buffer 404. The regions are Region A 405 and Region B 406 where Region A is assigned to Application Program A and Region B is assigned to Application Program B. Application Program A is responsible for producing display content for Region A and Application Program B is responsible for producing display content for Region B. Display content for area outside Region A and Region B is produced by the window manager. In each refresh cycle, content in the video buffer is shown on a display.

Figure 5:
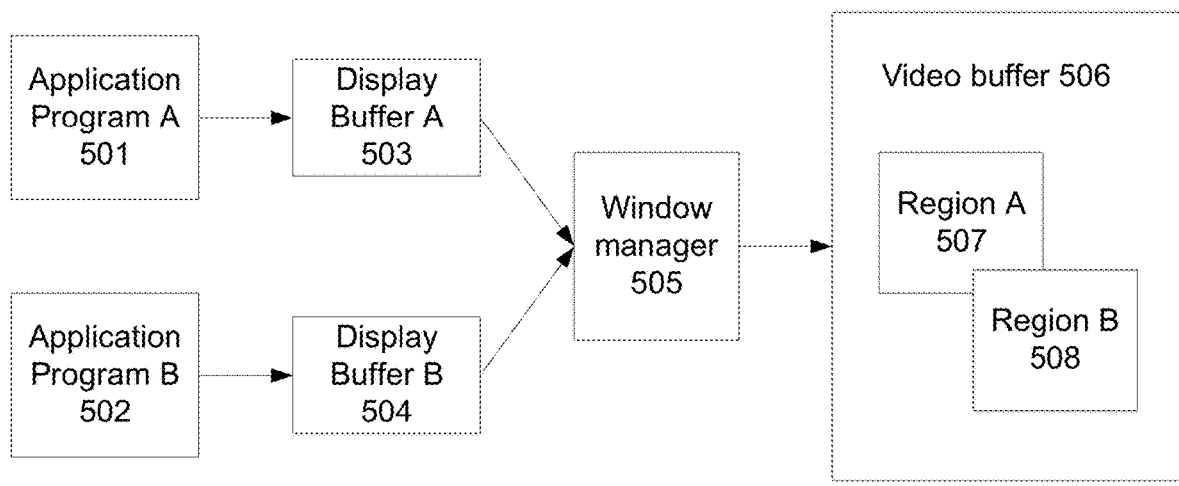
FIG. 5 shows a block diagram of a compositing window manager composing a video frame from display contents produced by two application programs.

FIG. 5 shows a compositing window manager composing a video frame from display contents produced by two application programs. Application Program A 501 and Application Program B 502 are two application programs running on a computing device. A window manager 505 also running on the computing device assigns Display Buffer A 503 to Application Program A and Display Buffer B 504 to Application Program B. Display content of Application Program A is saved in Display Buffer A. Similarly, display content of Application Program B is saved in Display Buffer B. The window manager produces composite content using contents of Display Buffer A and Display Buffer B where content of Display Buffer A is mapped to Region A 507 and content of Display Buffer B is mapped to Region B 508 on a video buffer 506. The composite content is saved in the video buffer. In each refresh cycle, composite content in the video buffer is shown on a display.

Both stacking window manager and compositing window manager may work with one or more video buffers. When a computing device has only one video buffer, the video buffer needs to support both production and consumption of display content. To avoid defects from showing up on a display, a window manager must control production timing so that it does not overlap with consumption cycle (i.e., video refresh). A common solution to avoid production and consumption time overlapping problem is to provide two or more video buffers, thereby at least one video buffer is assigned to production while at least one video buffer is assigned to consumption at a given time. Typically, the video buffer associates with consumption is referred to as front buffer. The video buffer associates with production is referred to as back buffer. The role of front and back buffers may be switched or swapped. Before the start of a video refresh cycle, if production has completed on a back buffer, a window manager switches front and back buffers to cause updated content in the previously back buffer to be displayed. For example, buffer A, a back buffer before a switch will become a front buffer after a switch. Similarly, buffer B, a front buffer before a switch will become a back buffer after a switch. The technique of using two or more video buffers for production and consumption is sometimes referred to as double buffering or multiple buffering.

A display buffer may comprise rasterized data, graphical elements, graphics rendering commands, or any combination thereof. Rasterized data refers to color values of one or more pixels to be displayed. Graphical elements refer to constructs of 2D or 3D graphics including pixel, polygon, vertex, texture, shader, transition, viewport, visual tree, and more. Graphics rendering commands refer to processor instructions, commands, procedure, directive and other methods that direct rendering of graphics. Graphical elements or graphics rendering commands may be created, represented or programmed with graphical programming language or instructions, or graphical programming interface such as Open Graphics Language (OpenGL), Microsoft DirectX®, Microsoft Direct3D®, Open Command Language (OpenCL) and more.

A display buffer may reside in main or video memory.

Display Content Augmentation

Display content augmentation refers to the technique of altering display content before it is shown on a display. Display content augmentation may alter a region on a display or an entire display. Display content augmentation may be implemented as an extension to a graphical user interface component of an operating system or as an integral part of a graphical user interface. Display content augmentation is not a feature of an application program. Display content augmentation may be applied to display content produced by an application program or different application programs running on a computing device.

Display content augmentation may be additive, destructive, or combination of both. Additive display content augmentation refers to combining new display content with existing display content whereby both new and existing display contents are visible. An example of additive display content augmentation is overlaying semitransparent text, graphics or image on existing display content. Another example of additive display content augmentation is applying exclusive or (XOR) operation on existing content and augmentation content thereby altering color of existing content in areas where augmentation and existing contents overlap. Destructive display content augmentation refers to blocking or removing a portion of existing display content whereby making the portion of existing display content not visible. An example of destructive display content augmentation is overlaying opaque text, graphics or image over an area of existing display content whereby making existing display content in the area not visible.

Display content augmentation has many applications including information security, advertisement, education and training, customer support, augmented reality, supplementing display content, annotating display content, redacting display content, enhancing user interface navigation, and more. Display content augmentation may be implemented in an information management system or information security application to protected visual content. Examples of information management systems or information security applications include NextLabs® Control Center, NextLabs® Entitlement Management, NextLabs® Rights Management or NextLabs® Data Protection. Techniques of protecting information in an information management system or information security application are described in details in U.S. patent application Ser. No. 11/615,477, filed Dec. 22, 2006 and other U.S. patent applications listed above, which are incorporated by reference.

In an example, display content augmentation is applied to information security, content of a document becomes unprotected once the content is visible on a display. The visible content may be captured using screen capture function of a computing device or a camera external to a computing device. Captured content is unprotected. To afford visible content protection similar to printed content, a security marker may be layered on top of protected content before it is displayed, thereby visible content is displayed with a security marker and captured content also will include a security marker. A security marker works similar to traditional watermark on a printed document. A security marker is always placed on top of content it protects. One or more security marker may be placed on top of protected content or entire display. A security marker may compose a user name, computer name, date, disclaimer message, warning message, and more. Protected content may consist of media types including simple text, bitmap, 2D graphics, 3D graphics, animation, video and any combination thereof. To protect a high value or sensitive document, a security marker may be employed along with other information security means that control access or usage of the document. Other information security means are described in details in U.S. patent application Ser. No. 11/615,477, filed Dec. 22, 2006 and other U.S. patent applications previously listed, which are incorporated by reference.

A document may be a file system or non-file system object. For example, a file system object may be a word processing file, spreadsheet file, portable document format (PDF) file, 2D computer aided design (CAD) data file or 3D CAD data file. A non-file system object may be an e-mail message, attachment of an e-mail message, file in an archive such as a zip file or Adobe® Portfolio, data delivered to an SAP® frontend client application (e.g., information about an employee) by an SAP® human resource module running on a server.

A document may encompass objects such as a file, compound document, e-mail message, web page, result set generated by a database query, or any unit of information content stored in volatile or nonvolatile memory.

In another example, display content augmentation is applied to information security, information that should not be visible to a particular user on a computing device may be redacted using display content augmentation making such information not visible to the particular user.

In yet another example, display content augmentation is applied to advertisement, an application program detects a blank area or locked screen on a display and shows an advertisement over the blank area or locked screen.

In yet another example, display content augmentation is applied to supplementing display content, information relevant to a document and current user may be displayed as augmentation content when the document is opened on a computing device. Relevant information includes task list, calendar, document revisions, viewing history, and more.

In yet another example, display content augmentation is applied to annotate display content, a user annotates content shown on a display using a mouse, a finger, or any input device. To display annotation created by the user, annotation is rendered as augmentation content over existing display content. To save the annotation, both annotation and existing display content may be saved in a file.

In yet another example, display content augmentation is applied to enhancing navigation of user interface, an information kiosk shows a navigation menu as augmentation content on a display allowing a new user to navigate to the right content quickly. The navigation menu may be context sensitive.

In additional to rendering augmentation content, display content augmentation may also handle input from a user.

Display content augmentation may be an integral part of a window manager or an extension to a window manager. If display content augmentation is an extension to a window manager, the extension may be installed using an instrumentation technique. Instrumentation may be implemented using an application programming interface (API), operating system programming interface, operating system service provide, filter, event handler, device driver, code injection, hooking and more. Instrumentation may be installed statically or dynamically. Instrumentation techniques are described in details in U.S. patent application Ser. No. 11/383,159, filed May 12, 2006 and other U.S. patent applications listed above, which are incorporated by reference.

Figure 6:
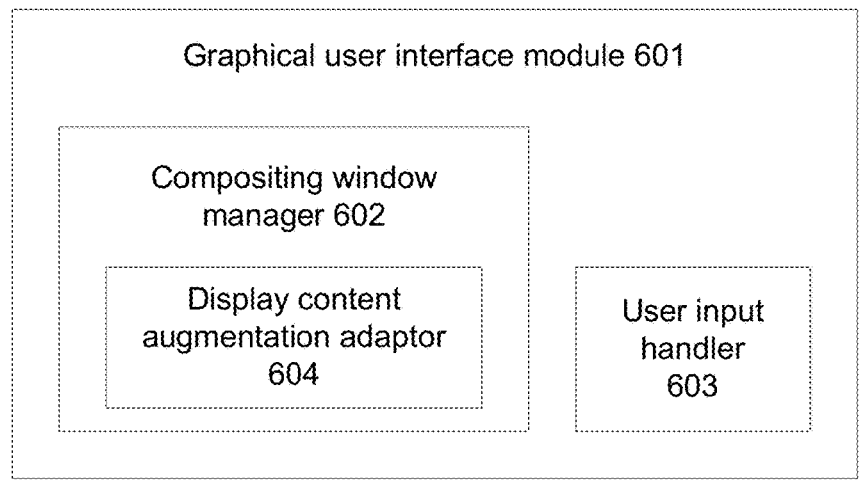
FIG. 6 shows a block diagram of a graphical user interface module with a compositing window manager and display content augmentation adapter.

FIG. 6 shows a block diagram of a graphical user interface module with a compositing window manager and display content augmentation adapter. The graphical user interface module 601 may be an integral part of an operating system or optional component that may be installed in operating system. Examples of operating systems where graphical user interfaces are integrated include Apple OS/X®, Apple iOS® or Microsoft Windows®. Examples of operating systems where graphical user interfaces are optional include Linux® or Unix®. The graphical user interface module comprises a compositing window manager 602 and user input handler 603. A display content augmentation adapter 604 is an extension installed in the compositing window manager.

Display Content Augmentation with a Stacking Window Manager

When a stacking window manager is present, display content augmentation may be implemented as an augmentation step performed after an application program finishes producing its display content.

A display content augmentation adapter may be installed in a graphics subsystem of a graphical user interface so that the display content augmentation adapter is invoked by the graphics subsystem immediately after an application program finishes rendering its display content. The display content augmentation adapter may render augmentation content over display content produced by an application program using an application program interface provided by a graphics subsystem. When a graphical user interface provides multiple graphics subsystems, a display content augmentation adapter may be installed in each graphics subsystem. Examples of graphics systems includes Microsoft Windows® Graphical Device Interface (GDI), GDI+, Microsoft DirectDraw®, Microsoft Direct3D®, Apple OS/X® Quartz, Microsoft Windows® OpenGL implementation, Open Group X Window System™ XDM, GDM or KDM, and more.

The technique described here works also with compositing window manager. However, the technique described below works more effectively with a compositing window manager.

Display Content Augmentation with a Compositing Window Manager

When a compositing window manager is present, display content augmentation may be an augmentation step performed after a compositing window manager finishes composing content for a video frame.

Figure 7:
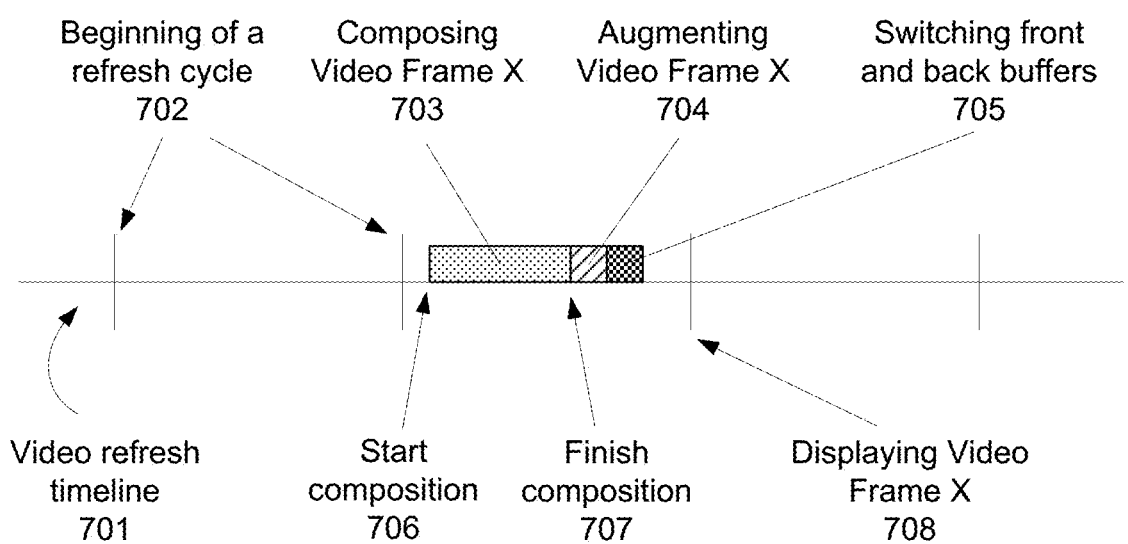
FIG. 7 shows production and consumption of content of a video frame on a video refresh timeline with display content augmentation.

FIG. 7 shows production and consumption of content of a video frame on a video refresh timeline with compositing window manager and display content augmentation. A video refresh timeline 701 shows the beginning of refresh cycles 702 as vertical markers. Each marker represents the beginning of a new refresh cycle. Video refresh takes place at a fix interval. Typical refresh rate is 30 or 60 Hz. At 30 Hz, 30 video frames are presented per second and each refresh cycle spans 1/30 second. At 60 Hz, 60 video frames are presented per second and each refresh cycle spans 1/60 second.

At time start composition 706, a compositing window manager 505 starts composing Video Frame X 703. Start composition may happen any time within a refresh cycle. It may varies based on performance of a computing device. Start composition is typically tuned to provide sufficient time for a compositing window manager to compose a video frame before the start of next refresh cycle. Video Frame X is one of the many video frames produced by the compositing window manager. It is chosen to illustrate invocation of display content augmentation step in related to video frame production and consumption. The content of Video Frame X generated by the compositing manager is saved in a back buffer. The compositing window manager finishes composing Video Frame X at time finish composition 707. After compositing window manager finishes composing Video Frame X, an augmenting Video Frame X 704 step is executed to render augmentation content. Augmentation content is saved in the back buffer. When augmenting Video Frame X step is completed, the compositing window manager executes switching front and back buffers 705 step, thereby making the back buffer holding Video Frame X available to video hardware. After the switching front and back buffers step, the back buffer holding Video Frame X becomes a front buffer. The switching front and back buffers step should happen before the start of next refresh cycle. At next refresh cycle after the switching front and back buffers step, content in the front buffer is consumed by video hardware thereby displaying Video Frame X 708 on a display.

The content composition steps of a compositing window manager outlined in this application are provided for illustration purposes only. Different content composition steps may be applied to achieve the same or other results.

Figure 8:
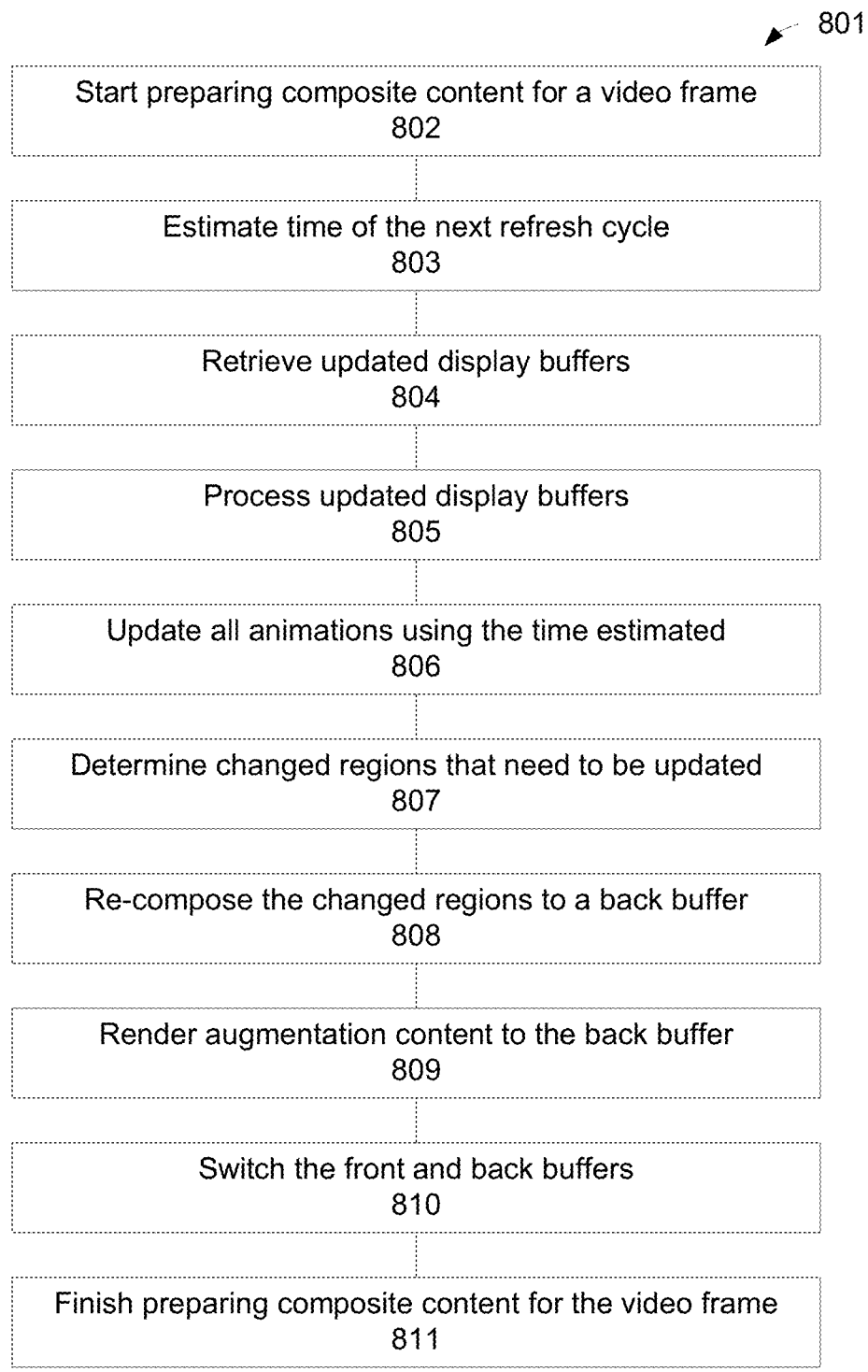
FIG. 8 shows an example flow of composing a video frame with a compositing window manager and display content augmentation.

FIG. 8 shows an example flow 801 of composing a video frame with a compositing window manager and display content augmentation. In step 802, a compositing window manager starts preparing composite content for a video frame. In step 803, the compositing window manager estimates time of next refresh cycle. The time will be used to produce output of time-dependent graphics such as animation. In step 804, the compositing window manager finds all display buffers that have been updated or changed. A display buffer may be updated by an application program. The updated display buffers contain updates or changes that need to be shown on a display. In step 805, the compositing window manager performs all necessary pre-composition processing on the updated display buffers. The pre-composition processing step may include computation of color adjustments. In step 806, the compositing window manager updates all animations using the time estimated in step 803. In step 807, the compositing window manager determines regions on a display that are changed and need to be updated. In step 808, the compositing window manager re-compose the changed regions to a back buffer. The compositing window manager may use contents in one or more display buffers including the update display buffers to re-compose the changed regions. In step 809, augmentation content is rendered to the back buffer. This step carries out display content augmentation corresponding to augmenting Video Frame X step 704 in FIG. 7. The augmentation content may be additive or destructive. If augmentation content does not apply to the changed region, step 809 may not be applied. In step 810, the compositing window manager switches the front and back buffers so that content rendered to the back buffer will be available for display in next refresh cycle. In step 811, the compositing window manager finishes preparing composite content for the video frame.

Different augmentation content may be rendered in step 809. Augmentation content may comprise text, graphics, image, or any combination thereof. Further, augmentation content may be semitransparent or opaque.

In an example, a window is opened on a graphical user interface on a computing device. The window is associated with an application program and the application program renders content of a document in the window (hereinafter referred to as display content in this example). The graphical user interface comprises a compositing window manager. The compositing window manager has a display content augmentation adapter installed and the display content augmentation adapter renders augmentation content over content of the document in the window.

The computing device includes video hardware that refreshes at 60 Hertz. In every 1/60 second, the video hardware consumes content in a video buffer and produces a visual representation of the content on a monitor or display. This event is referred to as video refresh. A video refresh cycle is the time between two sequential video refreshes. The computing device has two video buffers. These video buffers are identified as front buffer and back buffers based on the roles they play. The compositing window manager stores content in a back buffer, whereas the video hardware consumes content in a front buffer. The compositing window manager may switch roles of front and back buffers programmatically making a back buffer prior to a switch a front buffer after a switch and a front buffer prior to a switch a back buffer after a switch.

Composition of composite content in a back buffer by the compositing window manager is synchronized with video refreshes. In contrast, display content in a display buffer is rendered by the application program independent of video refreshes. When the compositing window manager starts composing composite content, it checks if content in the display buffer is changed. If there is no change in the display buffer and no change to the area rendered by the compositing window manager, the compositing window manager will not produce new composite content. In this case, content in current front buffer will be consumed by video hardware in next video refresh. If there is change in the display buffer, the compositing window manager will compose new composite content in the back buffer based on display content in the display buffer. Once composite content composition is completed, the compositing window manager invokes the display content augmentation adapter to render augmentation content in the back buffer. When the display content augmentation adapter completes rendering augmentation content, the compositing window manager switches the front and back buffers making the composite and augmentation contents available to next video refresh.

Figure 9:
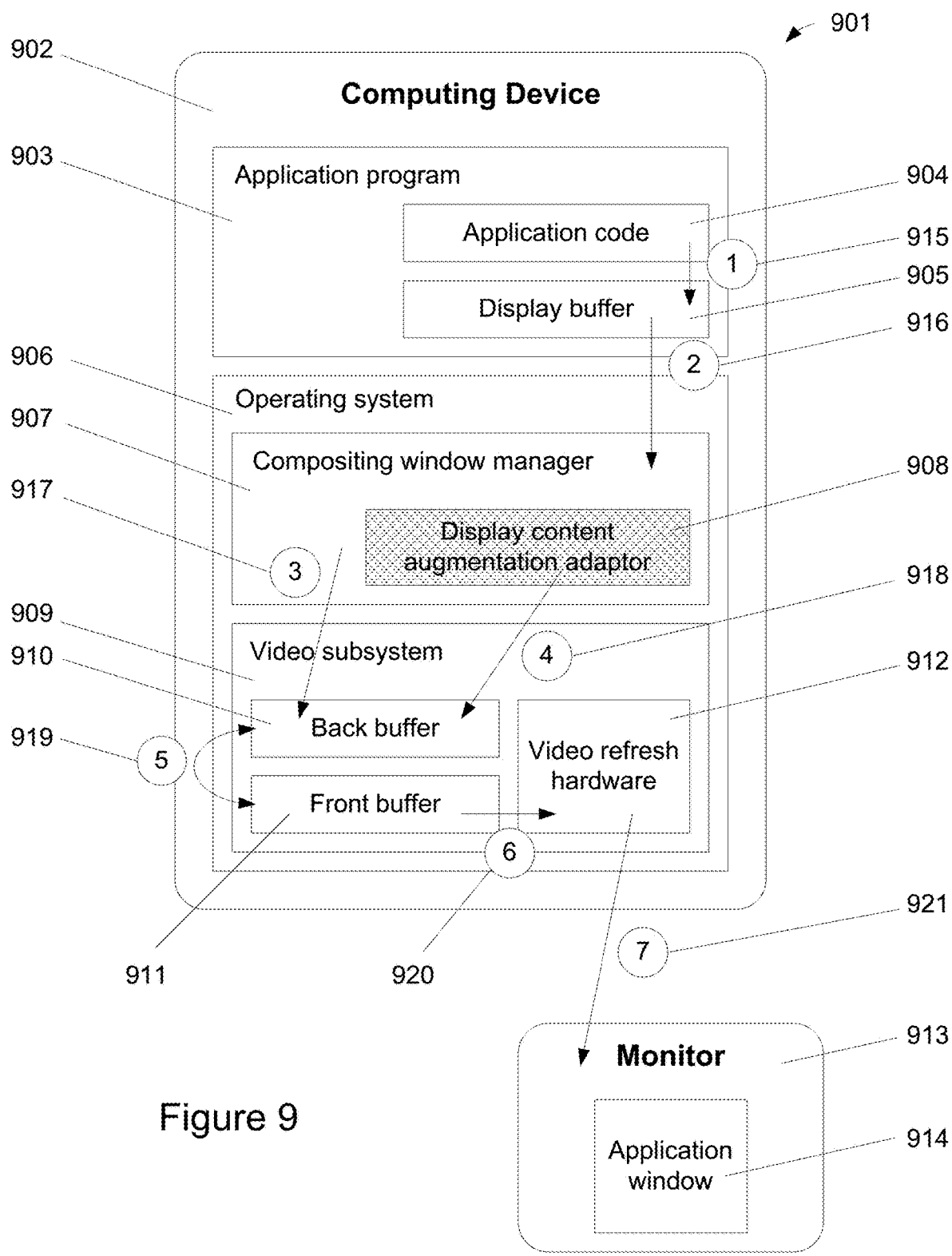
FIG. 9 shows a data flow diagram of display content augmentation with a display content augmentation adapter in a video refresh cycle.

Referring to FIG. 9, an example showing a data flow diagram 901 of display content augmentation in a video refresh cycle. Display content augmentation is performed by a display content augmentation adapter 908 installed in a compositing window manager 907. The compositing window manager is a part of a graphical user interface of an operating system 906. Both the operating system and an application program 903 run on a computing device 902. A video subsystem 909 of the operating system interfaces with video hardware such as a back buffer 910, a front buffer 911 and video refresh hardware 912.

The application program produces display content via an application code 904 module and the display content is stored in a display buffer 905. Typically, a display buffer resides in address space of an application program in main memory and the display buffer is accessible to a compositing window manager. Alternatively, a display buffer may reside in operating system address space or in shared memory.

In step (1) 915, the application code module renders display content in the display buffer. The application program may render display content in the display buffer any time and it does not depend on video refresh cycles. In this example, step (1) is triggered by a user opening a document with the application program. The document may be a file or any unit of information. Opening the document causes content of the document to be displayed in an application window 914 on a monitor 913. To display content of the document on the monitor, the application code module renders the content of the document in the display buffer.

In step (2) 916, the compositing window manager composes composite content based on display content in the display buffer. The compositing window manager starts composing composite content for the monitor some time before next video refresh. Typically, the compositing window manager checks if display content in the display buffer has changed. If display content in the display buffer has changed, the compositing window manager composes new composite content based on display content in the display buffer. If display content in the display buffer has not changed and there is no other change in the area owned by the compositing window manager, the compositing window will not compose new composite content thereby steps (3) to (5) will not occur. In step (3) 917, the compositing window manager stores composite content in the back buffer.

Figure 11A:
FIG. 11A shows a Microsoft Windows® desktop employing display content augmentation to overlay security markers on a 3D CAD drawing.
Figure 11B:
FIG. 11B shows a Microsoft Windows® desktop employing display content augmentation to overlay security markers on a video stream.

In step (4) 918, the display content augmentation adapter renders augmentation content in the back buffer. The compositing window manager invokes the display content augmentation adapter after it finishes composing composite content. Augmentation content may include text, graphics, images or any combination thereof. Augmentation content may be rendered on top of content of the document in the window or anywhere else on the monitor depending on application. For example, if the purpose of display content augmentation is security, augmentation content may be rendered over content of the document. Rendering augmentation content over content of the document refers to the technique of placing augmentation content closer to a user and visually blocking content of the document if necessary as illustrated in FIGS. 11A-11B described further below. Other application of display content augmentation may include navigation assistant, providing supplemental information, displaying input entered by a user, and more.

In step (5) 919, the compositing window manager switches the front and back buffers. After the switch, front buffer contains the composite and augmentation contents just produced by the compositing window manager and display content augmentation adapter.

In step (6) 920, the video refresh hardware consumes content in the front buffer in a video refresh. In step (7) 921, the video refresh hardware transmits data or signal to the monitor. When step (7) finishes, the composite and augmentation contents produced by the compositing window manager and display content augmentation adapter appears visually on the monitor.

Figure 10:
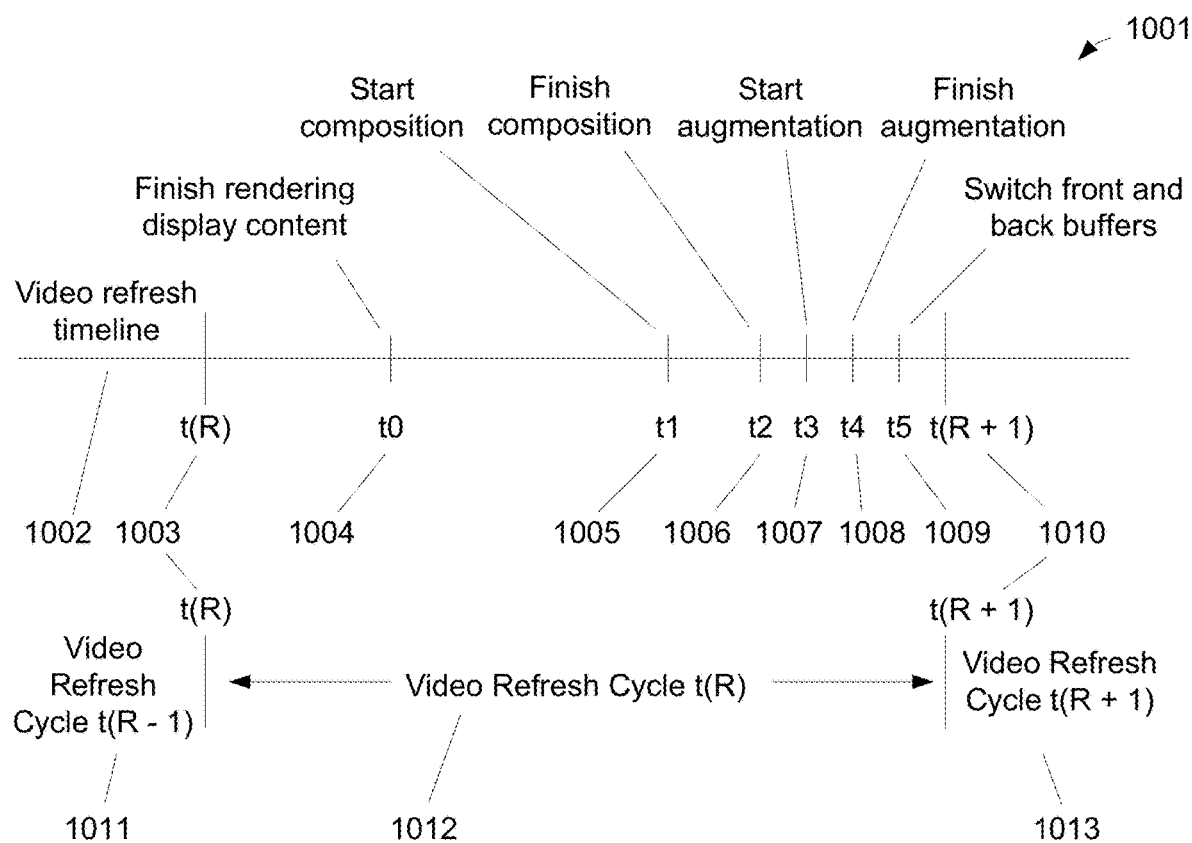
FIG. 10 shows a video refresh cycle corresponding to the data flow in FIG. 9 on a video refresh timeline.

Continuing with the data flow described in FIG. 9, FIG. 10 shows a video refresh cycle 1001 corresponding to the data flow on a video refresh timeline 1002. A video refresh cycle Video Refresh Cycle t(R) 1012 starts at time t(R) 1003 and ends at time t(R+1) 1010. The video refresh cycle immediately before Video Refresh Cycle t(R) is Video Refresh Cycle t(R−1) 1011 and the video refresh cycle immediately after Video Refresh Cycle t(R) is Video Refresh Cycle t(R+1) 1013.

At time t(R) 1003, video refresh hardware 912 consumes content in a front buffer 911 produced in Video Refresh Cycle t(R−1). The time t(R) is also the start of a new video refresh cycle Video Refresh Cycle t(R).

At time t0 1004, an application code 904 module finishes rendering display content in a display buffer 905. Time t0 corresponds to the end of data flow step (1) 915.

At time t1 1005, a compositing window manager 907 starts composing composite content in a back buffer 910. At time t2 1006, the compositing window manager finishes composing composite content. Data flow step (2) 916 and step (3) 917 happen between times t1 and t2. At time t2, the back buffer contains composite content for video refresh at t(R+1).

At time t3 1007, the compositing window manager invokes a display content augmentation adapter 908 to render augmentation content in the back buffer. Typically, there is no delay between times t2 and t3 (i.e., times t2=t3). At time t4 1008, the display content augmentation adapter finishes rendering augmentation content. Data flow step (4) 918 happens between times t3 and t4. At time t4, the back buffer contains composite and augmentation contents for video refresh at t(R+1).

At time t5 1009, the compositing window manager switches the front and back buffers 911 and 910. Time t5 corresponds to data flow step (5) 919. Typically, there is no delay between times t4 and t5 (i.e., times t4=t5). After time t5, the front buffer contains composite and augmentation contents for video refresh at t(R+1).

At time t(R+1) 1010, the video refresh hardware consumes content in the front buffer produced in the Video Refresh Cycle t(R). Time t(R+1) corresponds to steps (6) and (7) 920 and 921. At time t(R+1), the composite and augmentation contents visually appear on a monitor 913. The time t(R+1) is also the start of a new video refresh cycle Video Refresh Cycle t(R+1).

In an example, a user opens a protected document on a computer that implements display content augmentation. The computer runs a version of Microsoft Windows® operating system. A display content augmentation adapter places opaque security markers on top of content of a protected document, but not on content of a document that is not a protected document. A security marker comprises name of current login user, date and time.

Referring to FIG. 11A, a Microsoft Windows® desktop employs display content augmentation to overlay security markers on a protected document "2_Cylinder_Engine.jt". The Microsoft Windows® desktop 1101 has an application program window 1102. The application program window displays output of an application program Siemens® JT2GO 3D CAD model viewer which is a 3D CAD model in the protected document. To protect content of the protected document, security markers 1103 are rendered on top of the 3D CAD model using display content augmentation. Each security marker comprises a text string "User: yyeap@nextlabs.com Aug. 25, 2016 16:52:06".

Referring to FIG. 11B, a Microsoft Windows® desktop employs display content augmentation to overlay security markers on a protected document "nature.mpeg". The Microsoft Windows® desktop 1111 has an application program window 1112. The application program window displays output of an application program Microsoft Media Player® which is playing video content of the protect document. To protect content of the protected document, security markers 1113 are rendered on top of streaming video using display content augmentation. Each security marker comprises a text string "User: yyeap@nextlabs.com Aug. 29, 2016 13:39:35."

In another example, display content augmentation places security markers across a display or entire screen over contents of a protected document and a document that is not a protected document.

In an example, a user opens a 3D CAD drawing "Ultra high efficient turbine design.dwg" which is marked top secret on a computer where a display content augmentation adapter is installed. The 3D CAD drawing (also referred to as protected 3D CAD drawing in this example) is opened in AutoCAD®. When the protected 3D CAD drawing is opened in a window by AutoCAD®, security markers "Top Secret, John Doe, Mar. 4, 2016 15:30:29" are rendered on top of content of the protected 3D CAD drawing.

Figure 12:
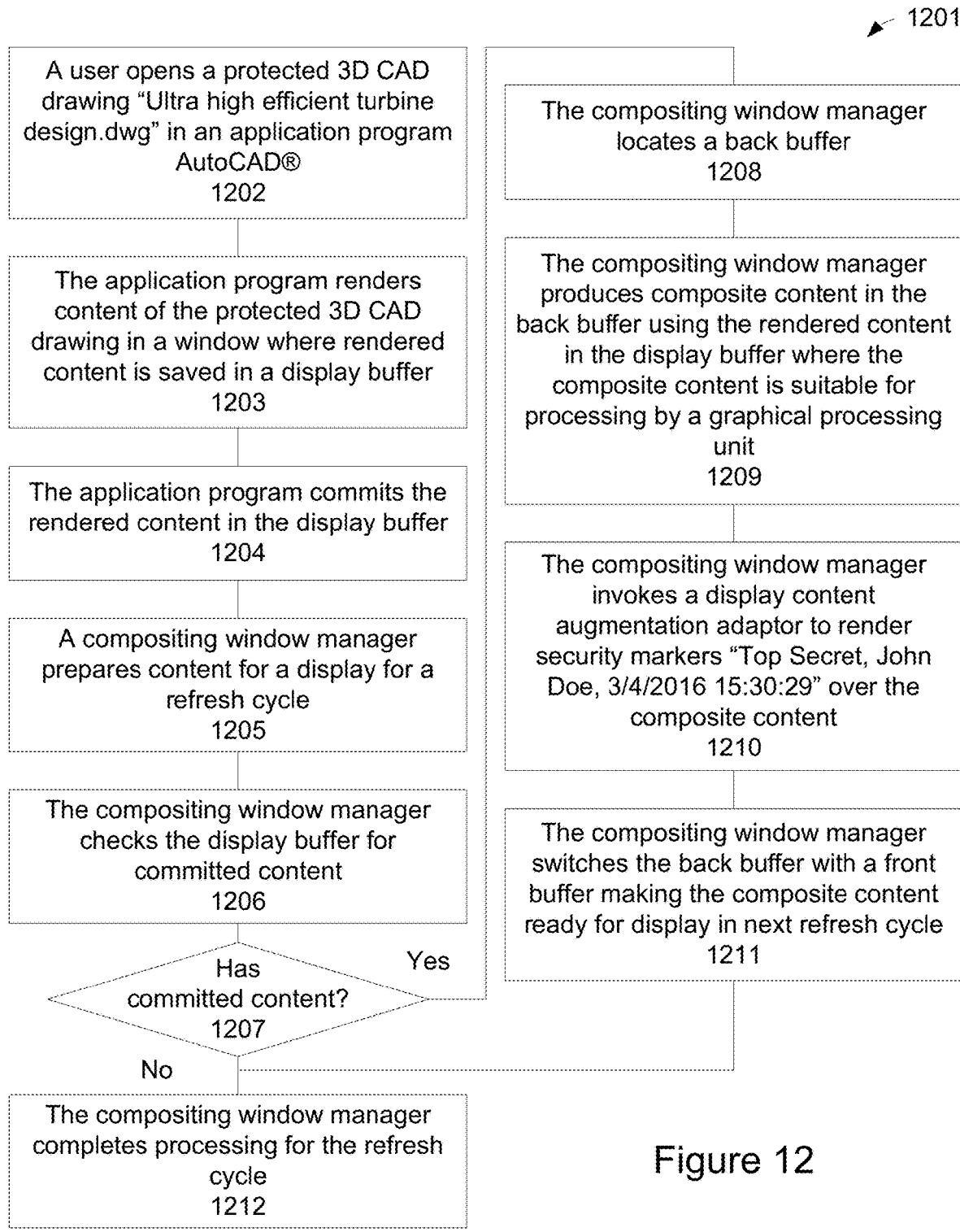
FIG. 12 shows an example flow of rendering a security marker over content of a protected 3D CAD drawing on a display using a display content augmentation adapter.

Referring to FIG. 12, an example flow 1201 renders security markers over content of a protected 3D CAD drawing on a display using a display content augmentation adapter. The display content augmentation adapter is a code module installed in Desktop Window Manager, a compositing window manager, on a computer running Microsoft Windows®. The computer utilizes a GPU to accelerate graphics rendering and rendering of the protected 3D CAD drawing and security markers are performed in part in the GPU. In step 1202, a user opens a protected 3D CAD drawing "Ultra high efficient turbine design.dwg" in an application program AutoCAD® on a computer. In step 1203, the application program renders content of the protected 3D CAD drawing in a window where rendered content is saved in a display buffer. The application program renders 3D objects using graphics languages such as Microsoft Direct3D® or OpenGL which may produces rasterized data, graphics language primitives, graphics language command and other data in the display buffer. In step 1204, the application program commits the rendered content in the display buffer. Committing rendered content signals to a compositing window manager there is a change in a display buffer and this commit step is required in some compositing window manager implementations. If a compositing window manager does not require the committing of rendered content, step 1204 is not required.

In step 1205, a compositing window manager prepares content for a display for a refresh cycle. A compositing window manager becomes active some time before the start of a refresh cycle so it may prepare composite content for the refresh cycle. This step corresponds to start composition 706 on a video refresh timeline in FIG. 7. A compositing window manager takes contents from one or more display buffers to compose composite content. Composite content is stored in a video buffer. Display buffers are typically stored in main memory and composite content is stored in video memory. In step 1206, the compositing window manager checks the display buffer for committed content. If committing of rendered content is not required in step 1204, the compositing window manager checks if the display buffer is dirty or changed. If there is no committed content to be processed or the display buffer is not dirty, the compositing window manager advances to step 1212.

In step 1208, the compositing window manager locates a back buffer. A back buffer is a video buffer. It is used to store composite content of a video frame to be used in next refresh cycle. Content of a back buffer is not visible to a user before it is made a front buffer. In step 1209, the compositing window manager produces composite content in the back buffer using the rendered content in the display buffer. A subset of composite content suitable for processing by a graphical processing unit (or GPU) is sent to a GPU. In step 1210, the compositing window manager invokes a display content augmentation adapter to generate augmentation content whereby rendering security markers "Top Secret, John Doe, Mar. 4, 2016 15:30:29" over the composite content. A subset of augmentation content suitable for processing by a GPU is sent to a GPU. This step corresponds to augmenting Video Frame X 704 in a video refresh timeline in FIG. 7. The security markers may comprise text, graphics, bitmaps, or any combination thereof. They may be semitransparent or opaque. The security markers may be constructed using Microsoft Direct3D® or OpenGL application program interface.

In step 1211, the compositing window manager switches the back buffer with a front buffer making the composite content ready for display in next refresh cycle. This step corresponds to switching front and back buffers 705 in a video refresh timeline in FIG. 7. In step 1212, the compositing window manager completes processing for the refresh cycle. Composite content in the current front buffer will be displayed in the next refresh cycle resulting in the protected three-dimensional (3D) computer aided design (CAD) drawing being shown or visible in a window with security markers overlaid on top of it.

In an example, a user opens a protected document "/marketing/confidential/New product launch plan.pdf" in a document viewer on a computer where display content augmentation is a feature of a compositing window manager. The protected document is marked confidential. When the protected document is opened in a window by the document viewer, security markers having text "Highly Confidential, Jason Manning, Jan. 1, 2016 9:01:01" are rendered on top of content of the protected document.

Figure 13:
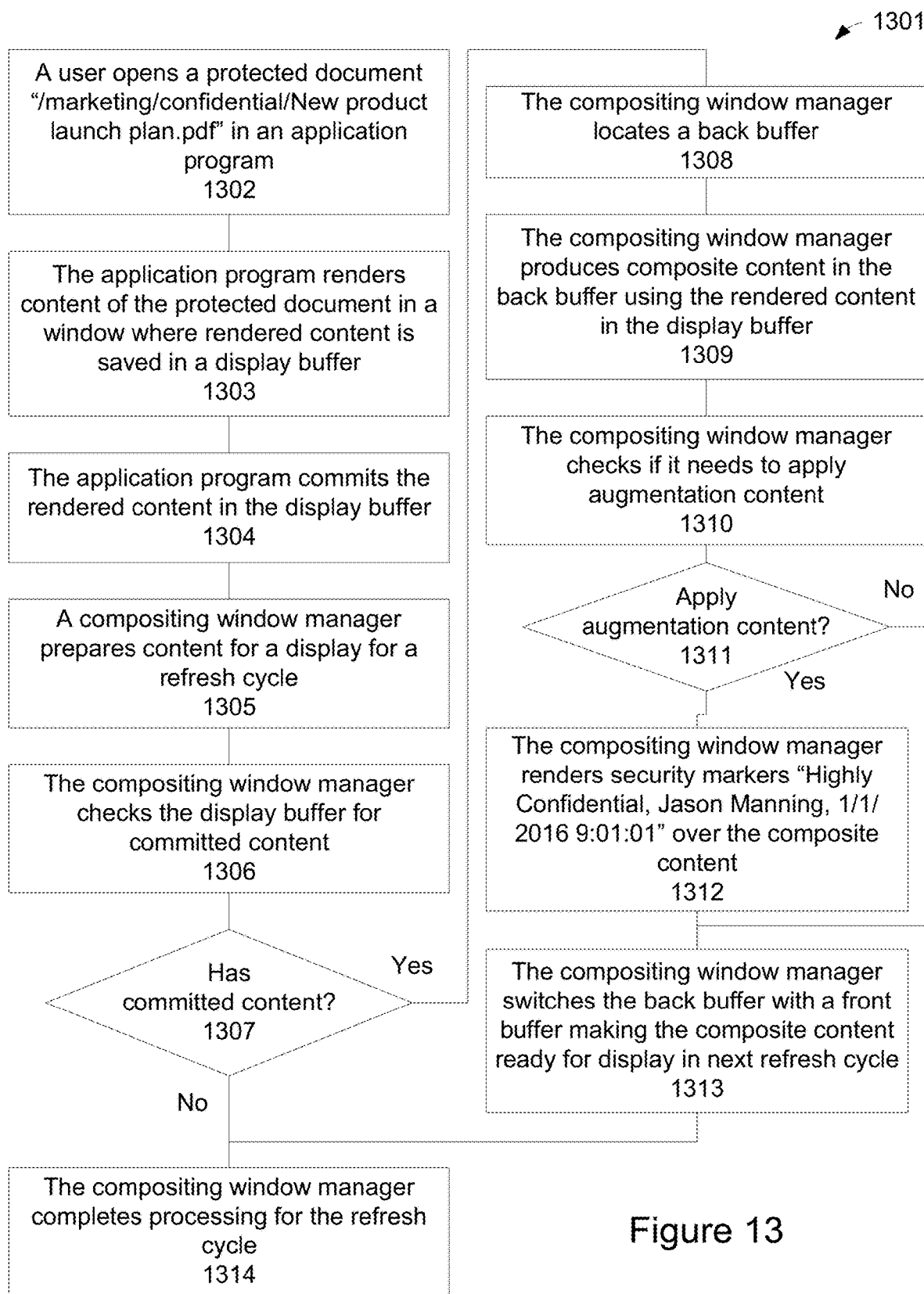
FIG. 13 shows an example flow of rendering a security marker over content of a protected document on a display with display content augmentation integrated into a compositing window manager.

Referring to FIG. 13, an example flow 1301 renders security markers over content of a protected document on a display with display content augmentation integrated into a compositing window manager. The compositing window manager is a part of a graphical user interface of a computer. The computer may utilize a GPU to accelerate graphics rendering. However, rendering of composite and augmentation contents may be performed without a GPU. In step 1302, a user opens a protected document "/marketing/confidential/New product launch plan.pdf" in an application program. The application program is a document viewer. In step 1303, the application program renders content of the protected document in a window where rendered content is saved in a display buffer. In step 1304, the application program commits the rendered content in the display buffer. Committing rendered content signals to a compositing window manager there is a change in a display buffer and this commit step is required in some compositing window manager implementations. If a compositing window manager does not require the committing of rendered content, step 1304 is not required.

In step 1305, a compositing window manager prepares content for a display for a refresh cycle. A compositing window manager becomes active some time before the start of a refresh cycle so it may prepare composite content for the refresh cycle. This step corresponds to start composition 706 on a video refresh timeline in FIG. 7. A compositing window manager takes contents from one or more display buffers to compose composite content. Composite content is stored in a video buffer. Display buffers are typically stored in main memory and composite content is stored in video memory. In step 1306, the compositing window manager checks the display buffer for committed content. If committing of rendered content is not required in step 1304, the compositing window manager checks if the display buffer is dirty or changed. If there is no committed content to be processed or the display buffer is not dirty, the compositing window manager advances to step 1314.

In step 1308, the compositing window manager locates a back buffer. A back buffer is a video buffer. It is used to store composite content of a video frame to be used in next refresh cycle. Content of a back buffer is not visible to a user before it is made a front buffer. In step 1309, the compositing window manager produces composite content in the back buffer using the rendered content in the display buffer. In step 1310, the compositing window manager checks if it needs to apply augmentation content. If the compositing window manager determines it does not need to apply augmentation content, it advances to step 1313.

In step 1312, the compositing window manager renders security markers "Highly Confidential, Jason Manning, Jan. 1, 2016 9:01:01" over the composite content. This step corresponds to augmenting Video Frame X 704 in a video refresh timeline in FIG. 7. The security markers may comprise text, graphics, bitmaps, or any combination thereof. They may be semitransparent or opaque.

In step 1313, the compositing window manager switches the back buffer with a front buffer making the composite content ready for display in next refresh cycle. This step corresponds to switching front and back buffers 705 in a video refresh timeline in FIG. 7. In step 1314, the compositing window manager completes processing for the refresh cycle. Composite content in the current front buffer will be displayed in the next refresh cycle resulting in the protected document being shown or visible with security markers overlaid on top of it.

In an example, a user opens a protected document "customer list.pdf" in a document viewer on a computer where a display content augmentation adapter is installed. The protected document is marked confidential. When the protected document is opened in a window by the document viewer, augmentation content including text "Confidential—For Internal Use Only" is rendered on top of content of the protected document.

Figure 14:
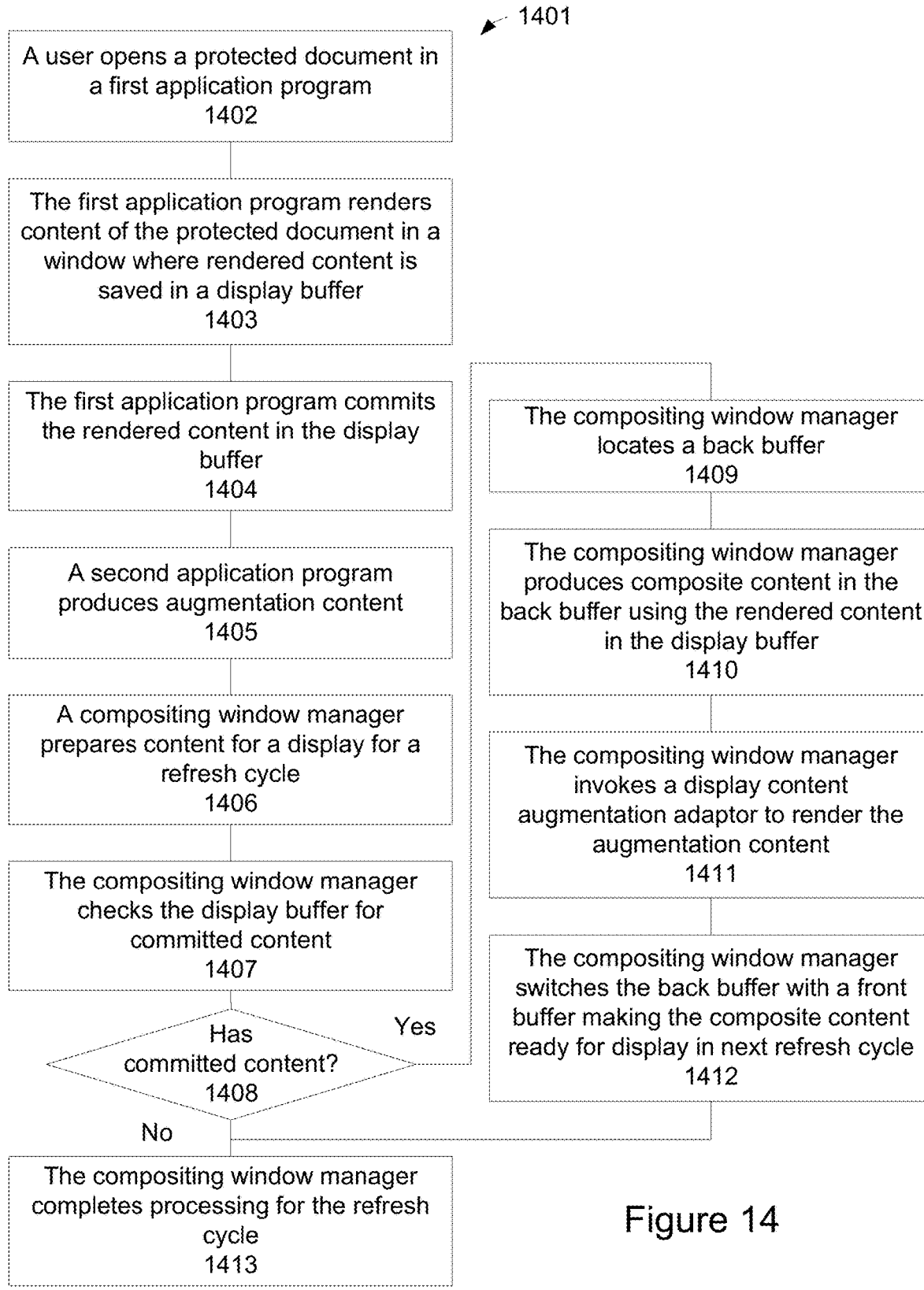
FIG. 14 shows an example flow of rendering augmentation content produced by a second application program over display content rendered by a first application program using a display content augmentation adapter.

Referring to FIG. 14, an example flow 1401 renders augmentation content produced by a second application program over display content rendered by a first application program using a display content augmentation adapter. The display content augmentation adapter is a code module installed in a compositing window manager on a computer. The computer may utilize a graphics processing unit or GPU to accelerate graphics rendering. In step 1402, a user opens a protected document "customer list.pdf" in a first application program. The first application program is a document viewer. In step 1403, the first application program renders content of the protected document in a window where rendered content is saved in a display buffer. In step 1404, the first application program commits the rendered content in the display buffer. Committing rendered content signals to a compositing window manager there is a change in a display buffer and this commit step is required in some compositing window manager implementations. If a compositing window manager does not require the committing of rendered content, step 1404 is not required.

In step 1405, a second application program produces augmentation content to be applied to the rendered content in the display buffer. The augmentation content may include text, graphics or an image. The augmentation content may include information about current user or the protected document.

In step 1406, a compositing window manager prepares content for a display for a refresh cycle. A compositing window manager becomes active some time before the start of a refresh cycle so it may prepare composite content for the refresh cycle. This step corresponds to start composition 706 on a video refresh timeline in FIG. 7. A compositing window manager takes contents from one or more display buffers to compose composite content. Composite content is stored in a video buffer. In step 1407, the compositing window manager checks the display buffer for committed content. If committing of rendered content is not required in step 1404, the compositing window manager checks if the display buffer is dirty or changed. If there is no committed content to be processed or the display buffer is not dirty, the compositing window manager advances to step 1413.

In step 1409, the compositing window manager locates a back buffer. A back buffer is a video buffer. It is used to store composite content of a video frame to be used in next refresh cycle. Content of a back buffer is not visible to a user before it is made a front buffer. In step 1410, the compositing window manager produces composite content in the back buffer using the rendered content in the display buffer. In step 1411, the compositing window manager invokes a display content augmentation adapter to render the augmentation content over the composite content. If a GPU exists, a subset of augmentation content suitable for processing by a GPU is sent to a GPU. This step corresponds to augmenting Video Frame X 704 in a video refresh timeline in FIG. 7.

In step 1412, the compositing window manager switches the back buffer with a front buffer making the composite content ready for display in next refresh cycle. This step corresponds to switching front and back buffers 705 in a video refresh timeline in FIG. 7. In step 1413, the compositing window manager completes processing for the refresh cycle. Composite content in the current front buffer will be displayed in the next refresh cycle resulting in the protected document being shown or visible with augmentation content overlaid on top of it.

In an example, display content augmentation is implemented using Microsoft DirectX® or Direct3D® application program interface (API) on a computer running Microsoft Windows®. Microsoft Windows® Desktop Window Manager, a compositing window manager, invokes a display content augmentation adapter after it finishes composing composite content for a video frame. The display content augmentation adapter is installed in Desktop Window Manager.

Figure 15:
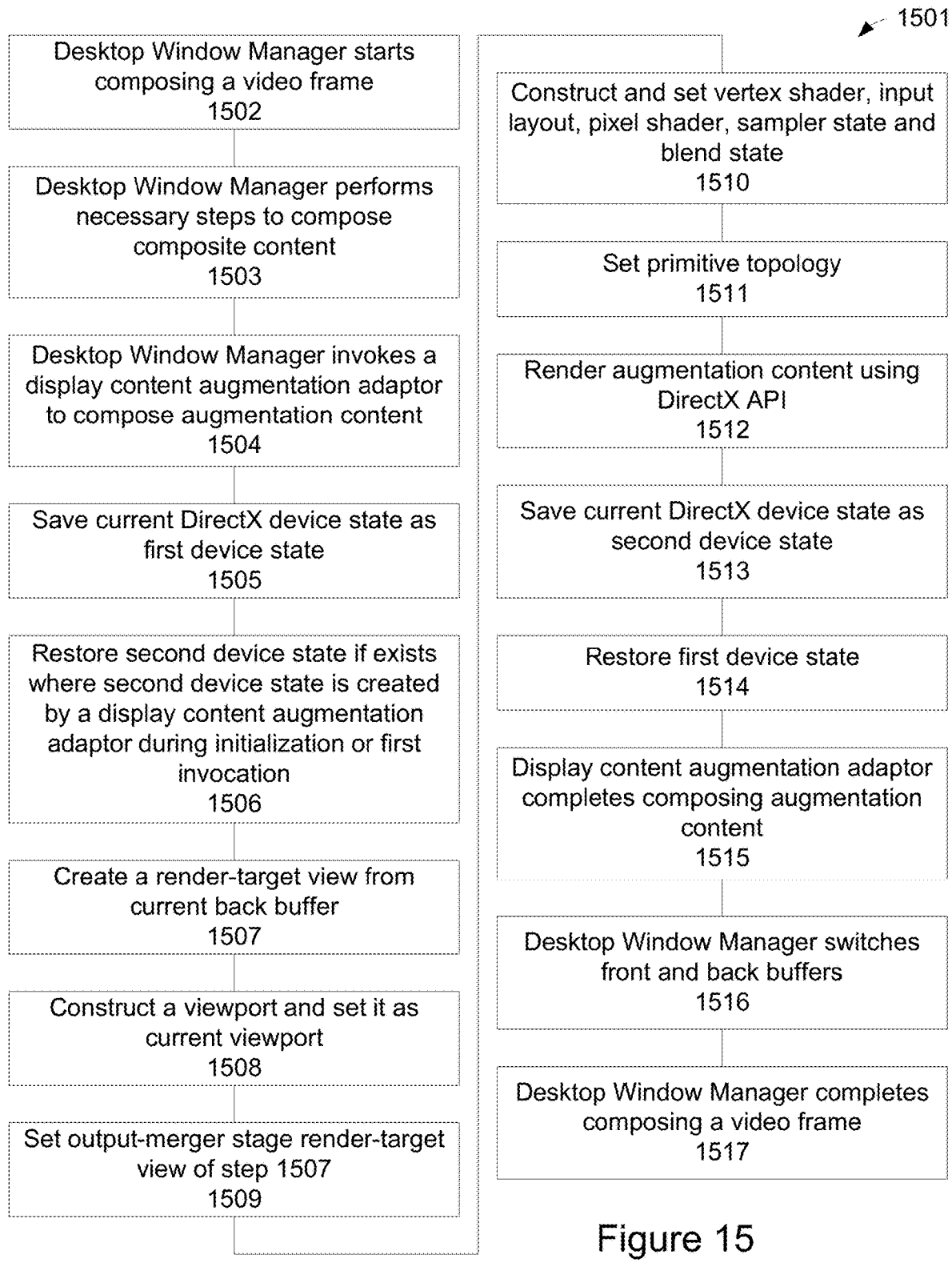
FIG. 15 shows an example flow of rendering augmentation content with a display content augmentation adapter using Microsoft DirectX® or Direct3D® API when Microsoft Windows® Desktop Window Manager composes composite content for a video frame.

Referring to FIG. 15, an example flow 1501 renders augmentation content with a display content augmentation adapter using Microsoft DirectX® or Direct3D® API when Microsoft Windows® Desktop Window Manager composes composite content for a video frame. A display content augmentation adapter is installed in Desktop Window Manager. The display content augmentation adapter is invoked by Desktop Window Manager right before a back buffer is being switched with a front buffer. As described in a video refresh timeline in FIG. 7, Desktop Window Manager composes a new video frame for each refresh cycle if there is a change to content of a display buffer. If there is no change to content of a display buffer, Desktop Window Manager does not recompose composite content and a front buffer from previous refresh cycle will be used in the next refresh cycle thereby visible content on a display remains unchanged.

In step 1502, Microsoft Windows® Desktop Window Manager starts composing a video frame. In step 1503, Desktop Window Manager performs necessary steps to compose composite content. Desktop Window Manager may check if there is a committed change in a display buffer. If there is no committed change, Desktop Window Manager does not need to recompose composite content for a video frame and advances to step 1517. If there is a committed change, Desktop Window Manager recomposes composite content. Methods of composing or recomposing composite content with a compositing window manager are detailed in the examples further above.

In step 1504, Desktop Window Manager invokes a display content augmentation adapter to compose augmentation content. The display content augmentation adapter is previously installed in Desktop Window Manager. Installation of a display content augmentation adapter may require instrumenting a Desktop Window Manager process to cause Desktop Window Manager to invoke the display content augmentation adapter. Steps 1505 to 1511 illustrate steps that may be taken to prepare a graphics context for rendering augmentation content. A graphics context is a logically element that groups various graphics parameters and data use in graphical operations.

In step 1505, the display content augmentation adapter saves current Microsoft DirectX® device state as first device state. The first device state is saved temporary so that it may be restored when the display content augmentation adapter completes generating augmentation content. In step 1506, the display content augmentation adapter restores a second device state if one exists. The second device state was created by the display content augmentation adapter during initialization or the first time when it was being invoked. Steps of saving and restoring second device state are optional. In another implementation, second device state is not saved and a display content augmentation adapter constructs the second device state each time it is invoked.

In step 1507, the display content augmentation adapter creates a render-target view from current back buffer. In step 1508, the display content augmentation adapter constructs a viewport and sets it as current viewport. In step 1509, the display content augmentation adapter sets output-merger stage render-target view of step 1507. In step 1510, the display content augmentation adapter initializes the graphics context for compositing augmentation content. It may construct and set vertex shader, input layout, pixel shader, sampler state, and blend state. In step 1511, the display content augmentation adapter sets primitive topology. In step 1512, the display content augmentation adapter renders augmentation content using Microsoft DirectX® API. Rendering augmentation content may include drawing text or graphics.

In step 1513, the display content augmentation adapter saves current Microsoft DirectX® device state as second device state. The second device state will be used in step 1506 in subsequent video frame composition. In step 1514, the display content augmentation adapter restores the first device state saved in step 1505. In step 1515, the display content augmentation adapter completes composing augmentation content. In step 1516, Desktop Window Manager switches the current back buffer containing the recomposed composite and augmentation contents with a front buffer making the recomposed composite and augmentation contents available for display. In step 1517, Desktop Window Manager completes composing a video frame.

The graphics rendering steps outlined in this application are provided for illustrative purposes only. Different graphics rendering steps may be applied to achieve the same or similar results.

In an example, a user opens a document "c:\new product\design\super smart design.docx" with an application program Microsoft Word® on a laptop computer running operating system Microsoft Windows 10®. The computer is protected by data protection client and display content augmentation adapter. The data protection client intercepts an open operation in the application program and evaluates policies on the open operation, document and user. If the result of policy evaluation allows the user to open the document, a security marker with the user's name and today's date will be place on top of content of the document. The data protection client communicates information about the application program process, document and user to the display content augmentation adapter. When the composite window manager in Microsoft Windows 10®, Window Desktop Manager, composes composite content for a display, the display content augmentation adapter renders security markers with text "Kathy Rollins, Mar. 18, 2016" on top of content of the document.

A data protection client is an application program tasked to enforce information or document access and use policies on a computing device. A policy or rule may specify access or usage control or rights on information or a document. A data protection client may include a policy engine. A policy engine selects policies relevant to an operation and evaluates the selected policies to produce an outcome. The data protection client and display content augmentation adapter are code modules that execute asynchronously. A data protection client is invoked in response to an intercepted application program operation, whereas a display content augmentation adapter is invoked by a compositing window manager that synchronizes its operation with video refresh cycles. Implementations and applications of data protection client, policy engine and policy are described in details in U.S. patent application Ser. No. 11/615,477, filed Dec. 22, 2006 and other U.S. patent applications listed above, which are incorporated by reference.

This example shows an application of display content augmentation adapter in information security where a display content augmentation adapter cooperates with a data protection client to selectively apply security markers on content of a document.

A policy used in this example is:
FOR document.name="c:\new product\design\*"
ON OPEN
BY USER="*"
DO ALLOW AND SecurityMarkerObligation ("{User}, {Today}")

Figure 16:
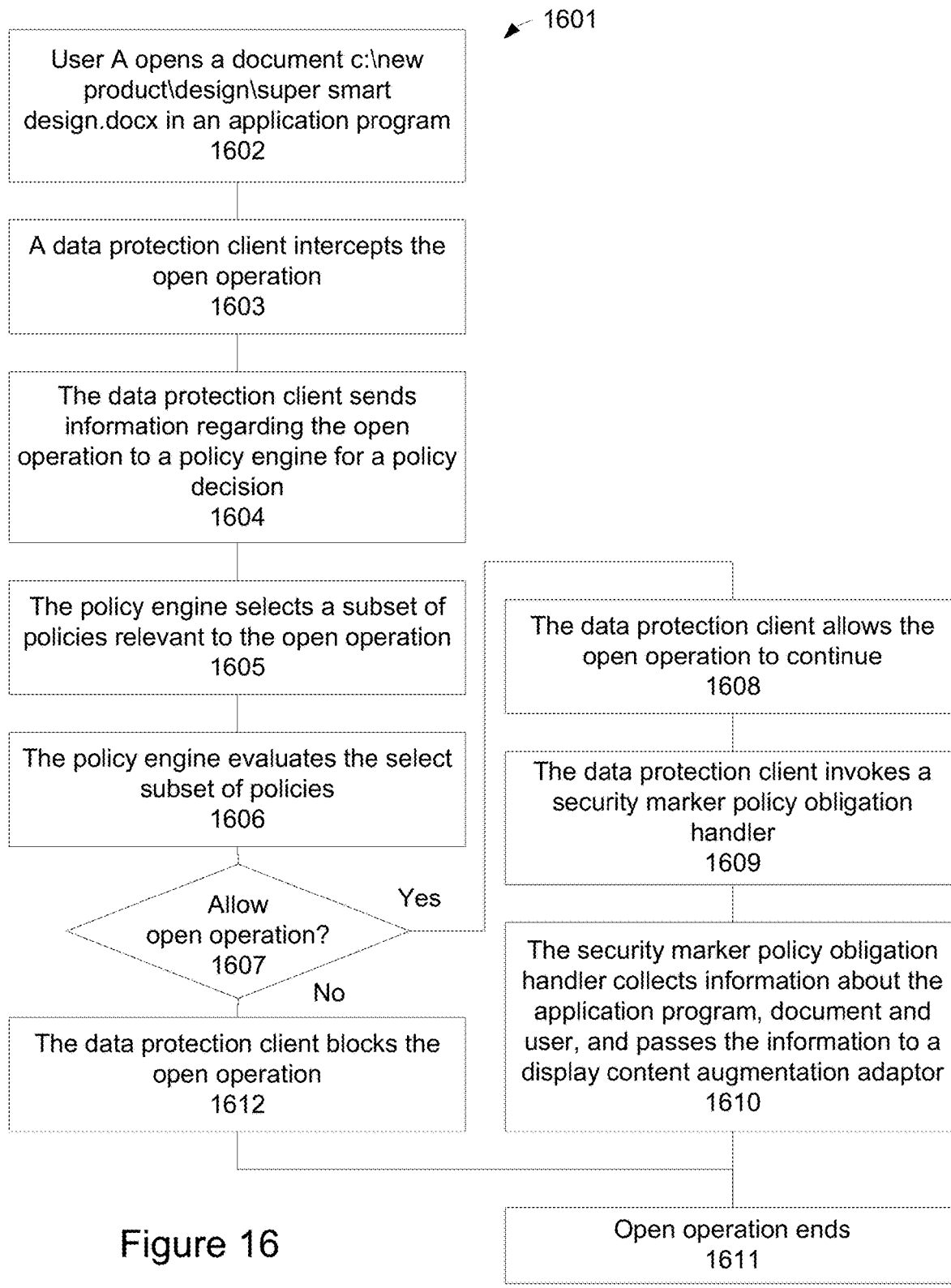
FIG. 16 shows an example flow of a data protection client implementing a security marker obligation with a display content augmentation adapter.

Referring to FIG. 16, an example flow 1601 of a data protection client implementing a security marker obligation with a display content augmentation adapter. In step 1602, a user User A opens a document "c:\new product\design\super smart design.docx" in an application program. In step 1603, a data protection client intercepts the open operation. The data protection client collects information relevant to the open operation. The information may include file path of the document, document attributes, current user and process identifier of the application program. In step 1604, the data protection client sends the information to a policy engine for policy evaluation. In step 1605, the policy engine selects a subset of policies relevant to the open operation, document and current user from a plurality of policies. In step 1606, the policy engine evaluates the selected subset of policies to produce a policy effect (e.g., allow or deny) and optionally one or more policy obligations.

In step 1612, if policy evaluation produces a policy effect deny, the data protection client blocks the open operation. Hence the application program fails to open the document.

In step 1608, if policy evaluation produces a policy effect allow, the data protection client allows the open operation to continue. Hence the application program opens the document successfully. In step 1609, the data protection client implements security marker policy obligation produced by policy evaluation in accordance with the policy described above in this example. The data protection client invokes a security marker policy obligation handler. In step 1610, the security marker policy obligation handler collects information about the application program, document and user. The information is passed to a display content augmentation adapter. The display content augmentation adapter uses the information to create a security marker and renders one or more security markers on top of the content of the document.

In step 1611, the open operation ends.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a computing device having a graphical user interface and a graphics processing unit wherein the graphics processing unit comprises a video buffer;
providing the graphical user interface having a compositing window manager wherein the compositing window manager produces composite content for a display;
providing a display content augmentation adapter for producing augmentation content wherein the compositing window manager invokes the display content augmentation adapter after producing composite content including content provided by an application for display by an operating system of the computing device, before the composite content has been augmented with a security marker, and before making the video buffer available for video refresh by the operating system;
opening a document in an application program on the computing device;
producing display content in a display buffer with content of the document by the application program;
producing composite content in the video buffer with the display content in the display buffer by the compositing window manager wherein the composite content comprises content of the document; and
invoking the display content augmentation adapter to render the augmentation content over the composite content by the compositing window manager wherein the augmentation content comprises a security marker rendered over content of the document.

2. The method of claim 1 wherein the document is a spreadsheet.

3. The method of claim 1 wherein the document is a 3D CAD drawing.

4. The method of claim 1 wherein the document is a video file.

5. The method of claim 1 wherein the document is a video stream.

6. The method of claim 1 wherein the compositing window manager is Microsoft Windows Desktop Window Manager.

7. The method of claim 1 wherein the display content augmentation adapter is installed in a process during a startup phase of the process.

8. The method of claim 1 wherein the display content comprises rasterized data, a graphical element or a graphics rendering command.

9. The method of claim 8 wherein the graphics rendering command is executed in the graphics processing unit.

10. The method of claim 1 wherein the producing composite content in the video buffer with the display content in the display buffer by the compositing window manager further comprises:
sending a subset of the display content in the display buffer to the graphics processing unit.

11. The method of claim 1 wherein the display content augmentation adapter renders augmentation content using Microsoft Direct3D application programming interface.

12. The method of claim 1 wherein the display content augmentation adapter renders augmentation content using OpenGL application programming interface.

13. The method of claim 1 wherein the augmentation content comprises a text string.

14. The method of claim 1 wherein the augmentation content comprises graphics or an image.

15. The method of claim 1 wherein the augmentation content is semitransparent, wherein the composite content under the augmentation content is visible.

16. The method of claim 1 wherein the augmentation content comprises a disclaimer message.

17. The method of claim 1 wherein the augmentation content comprises a warning message.

18. The method of claim 1 wherein the security marker is opaque, wherein the composite content under the security marker is not visible.

19. The method of claim 1 wherein the security marker describes a current user of the computing device.

20. The method of claim 1 wherein the security marker comprises a date.

21. The method of claim 1 wherein the display content augmentation adapter renders the composite content using an application program interface provided by a graphics subsystem.

22. The method of claim 1 comprising:
opening a second document in a second application program on the computing device;
producing second display content in a second display buffer with content of the second document by the second application program;
producing second composite content in a second video buffer with the second display content in the second display buffer by the compositing window manager wherein the second composite content comprises content of the second document; and
invoking the display content augmentation adapter to render second augmentation content over the second composite content by the compositing window manager wherein the second augmentation content comprises a second security marker rendered over content of the second document.

23. The method of claim 22 wherein the display buffer and the second display buffers are different buffers.

24. The method of claim 1 comprising:
evaluating a policy to determine whether to include the security marker when displaying the document, wherein invoking the display content augmentation adapter is in response to determining that the security marker is required.

25. The method of claim 1 comprising displaying the augmentation content and the composite content in the same window.

26. The method of claim 1 wherein the application program executes on an application layer of the computing device, and the display content is produced at the application layer and passed from the application layer to the operating system layer to produce the composite content.

27. The method of claim 1 wherein the application program includes the display buffer that passes the display content to the compositing window manager included at the operating system of the computing device.

28. The method of claim 1 wherein the video buffer comprises a front video buffer and a back video buffer and the computing device displays another composite content in the front video buffer while invoking the display content augmentation adapter to render the augmentation content over the composite content uses the back video buffer.

29. The method of claim 1 wherein the invoking the display content augmentation adapter to render the augmentation content over the composite content by the compositing window manager comprises:
at a first time, displaying first augmented composite content included in a front video buffer;
at the first time, generating second augmented composite content included in a rear video buffer;
at a second time, displaying second augmented composite content included in the rear video buffer; and
at the second time, generating third augmented composite content included in the front video buffer.

30. The method of claim 1 wherein the composite content includes additional content provided by a second application for display by the operating system of the computing device.

31. The method of claim 30 wherein the composite content comprises a first region corresponding to the application and a second region corresponding to the second application.

32. The method of claim 1 wherein the compositing windows manager is included by an operating system of the computing device.

33. The method of claim 1 wherein the display content augmentation adapter is provided separately from the application program.

34. The method of claim 1 wherein the compositing window manager provides content to be augmented from the application and an augmentation application, separate from the application, produces augmentation content for the application.

* * * * *